United States Patent
Ohr et al.

(10) Patent No.: US 9,429,199 B2
(45) Date of Patent: Aug. 30, 2016

(54) ALL-WHEEL DRIVE DISCONNECT CLUTCH

(71) Applicant: Schaeffler Technologies GmbH & Co. KG, Herzogenaurach (DE)

(72) Inventors: Carsten Ohr, Charlotte, NC (US); Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 173 days.

(21) Appl. No.: 14/319,299

(22) Filed: Jun. 30, 2014

(65) Prior Publication Data

US 2015/0014113 A1    Jan. 15, 2015

Related U.S. Application Data

(60) Provisional application No. 61/844,109, filed on Jul. 9, 2013.

(51) Int. Cl.
| | | |
|---|---|---|
| *F16D 15/00* | (2006.01) | |
| *F16D 13/14* | (2006.01) | |
| *F16D 23/12* | (2006.01) | |

(52) U.S. Cl.
CPC ............ *F16D 15/00* (2013.01); *F16D 13/14* (2013.01); *F16D 2023/123* (2013.01)

(58) Field of Classification Search
CPC ........ F16D 13/00; F16D 13/06; F16D 13/12; F16D 13/14; F16D 51/60
USPC .......................................................... 192/78
See application file for complete search history.

(56) References Cited

U.S. PATENT DOCUMENTS

| | | |
|---|---|---|
| 5,176,591 A | 1/1993 | Krisher |
| 5,885,182 A | 3/1999 | Forsyth |
| 6,520,885 B2 | 2/2003 | Gassmann et al. |
| 7,150,694 B2 | 12/2006 | Mizon et al. |
| 7,309,301 B2 | 12/2007 | Janson et al. |
| 7,448,977 B2 | 11/2008 | Janson et al. |
| 7,938,041 B1 | 5/2011 | Shiigi et al. |
| 2009/0159390 A1 | 6/2009 | Davis |
| 2011/0045934 A1 | 2/2011 | Biermann et al. |
| 2014/0231208 A1* | 8/2014 | Lee .......................... F16D 21/00 192/48.5 |
| 2015/0323018 A1* | 11/2015 | Hemphill .............. F16D 41/063 192/40 |

FOREIGN PATENT DOCUMENTS

| | | |
|---|---|---|
| DE | 1008537 | 5/1957 |
| GB | 163804 | 11/1920 |
| JP | S58113638 | 7/1983 |

* cited by examiner

*Primary Examiner* — Ramya Burgess
*Assistant Examiner* — Timothy M Hannon
(74) *Attorney, Agent, or Firm* — Simpson & Simpson, PLLC

(57) ABSTRACT

A wedge clutch, including: an inner hub; an outer race including an axially extending portion; and a plurality of wedge plates radially located between the inner hub and the axially extending portion. In a closed position for the clutch, the plurality of wedges is non-rotatably connected to the inner hub and the axially extending portion. In an open position for the clutch: the plurality of wedge plates is rotatable with respect to the outer race; each wedge plate is separated, in a radial direction, from the axially extending portion by a respective first radial distance; and the respective first radial distance for said each wedge plate is different from the respective first radial distance for each remaining wedge plate in the plurality of wedge plates.

19 Claims, 9 Drawing Sheets

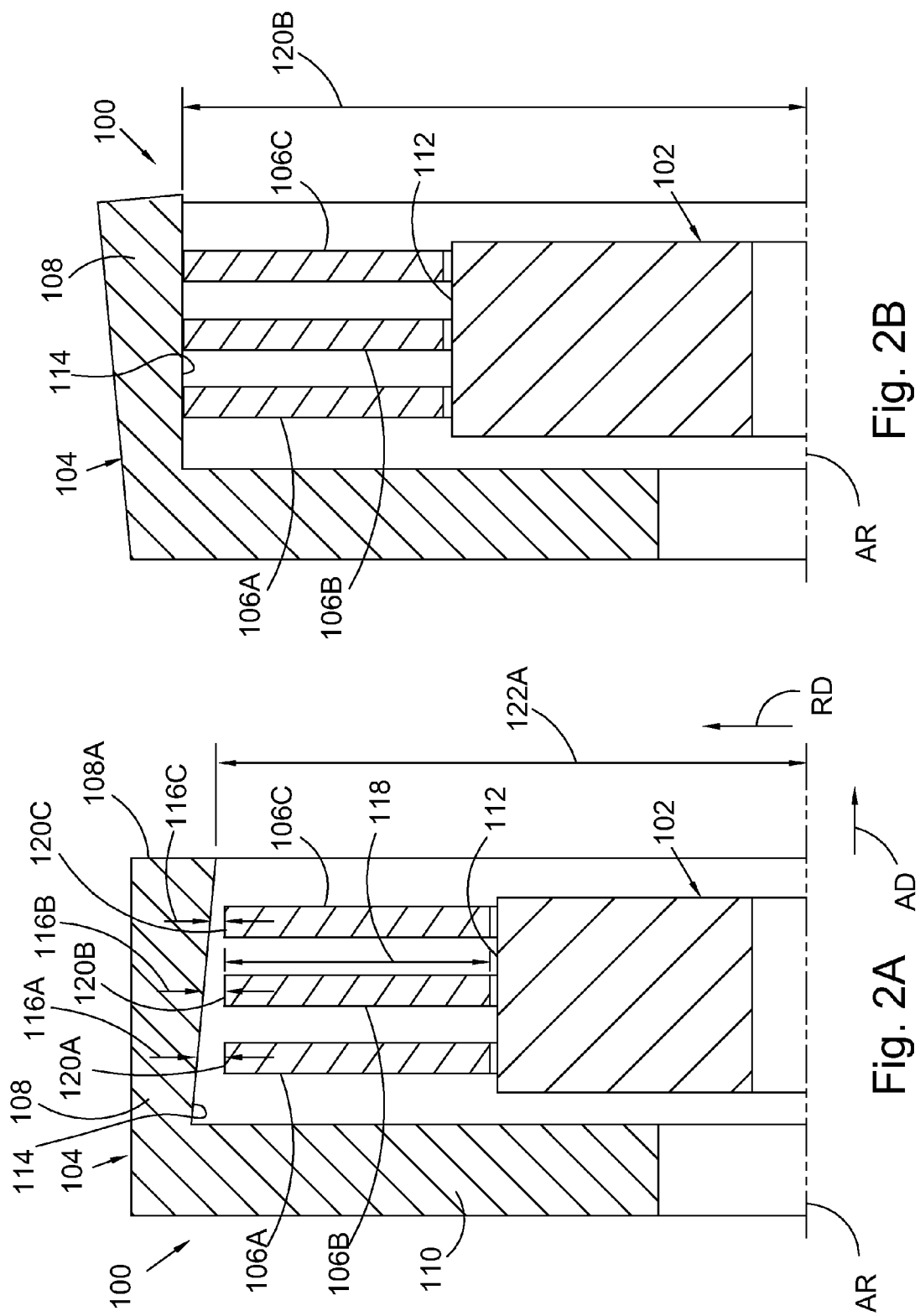

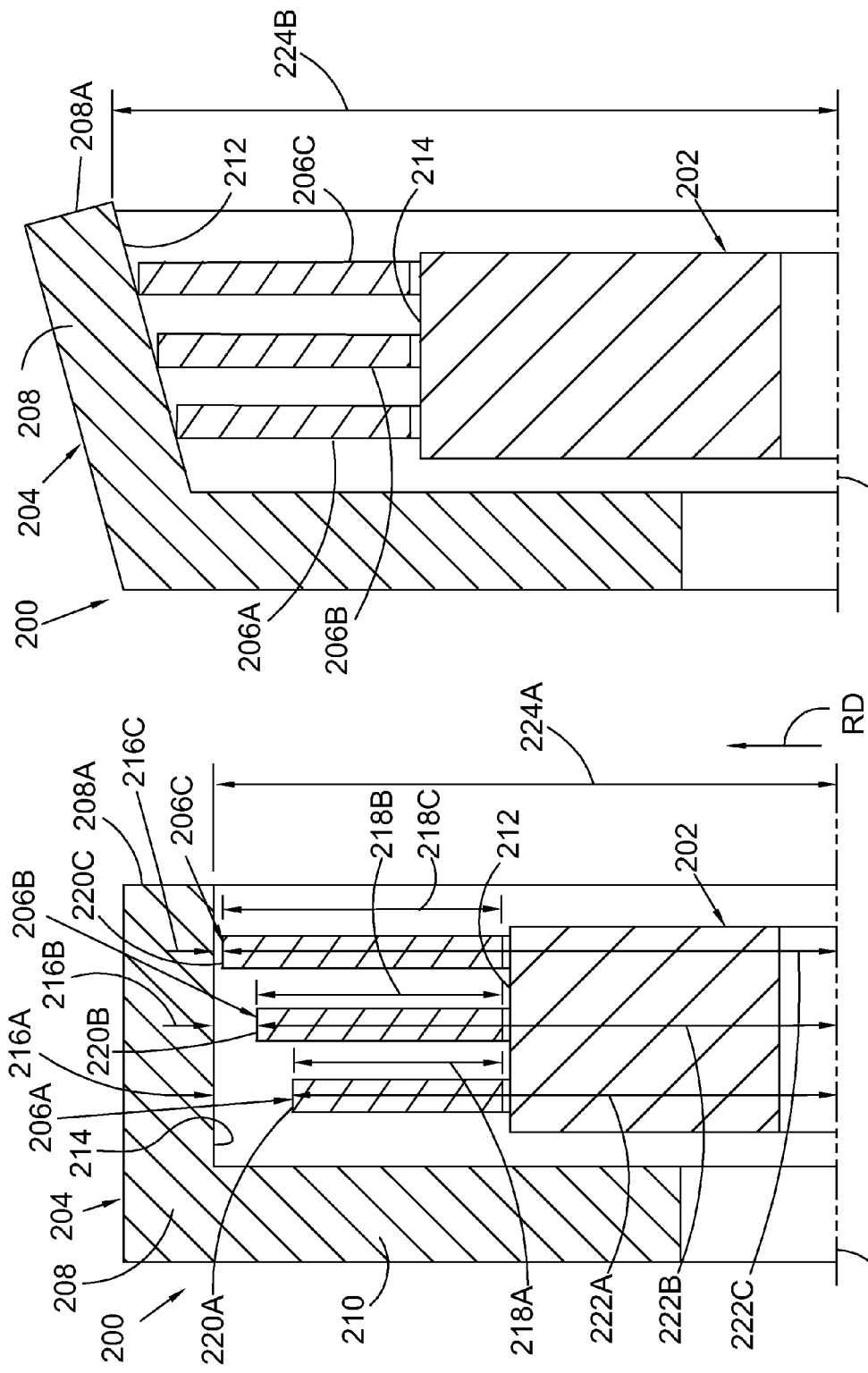

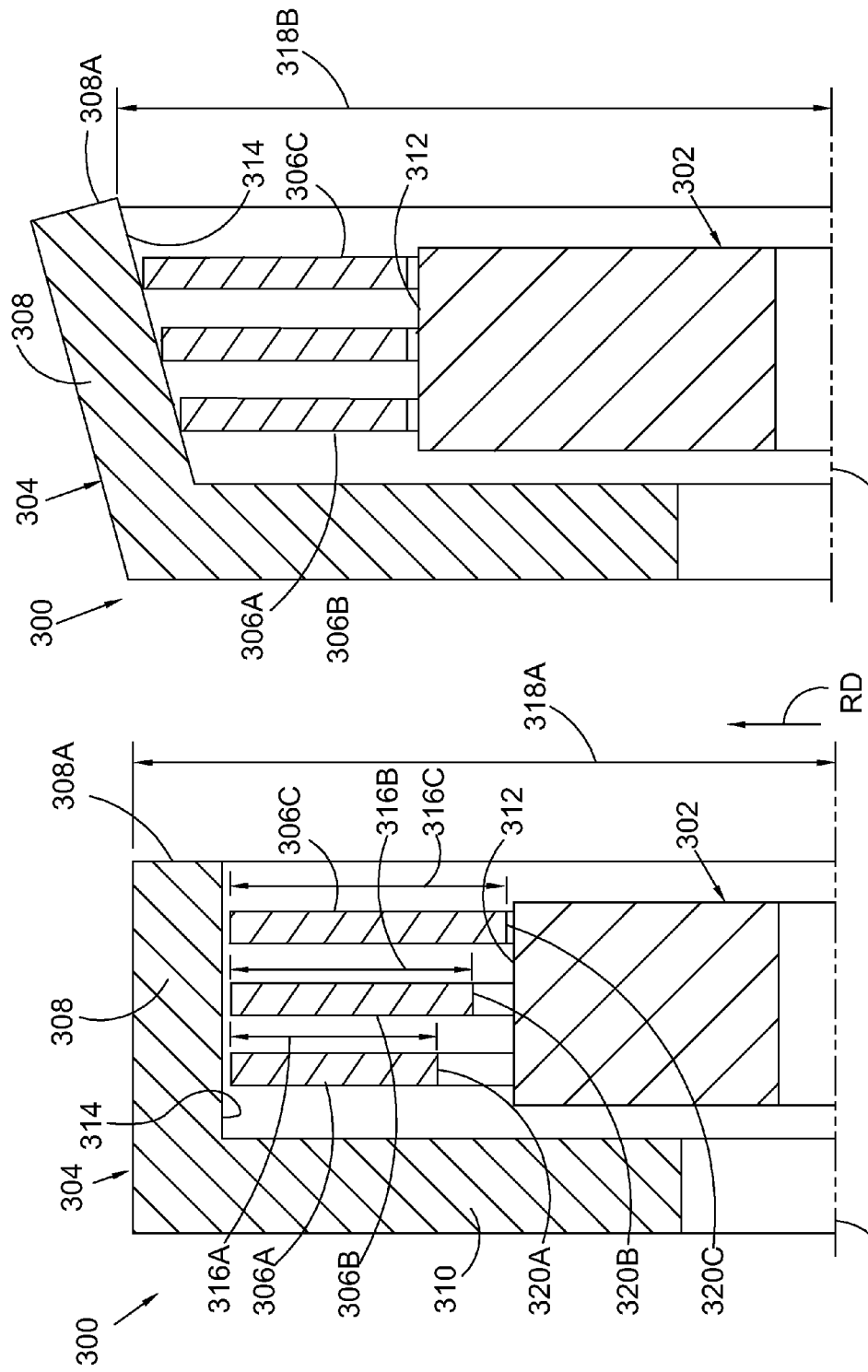

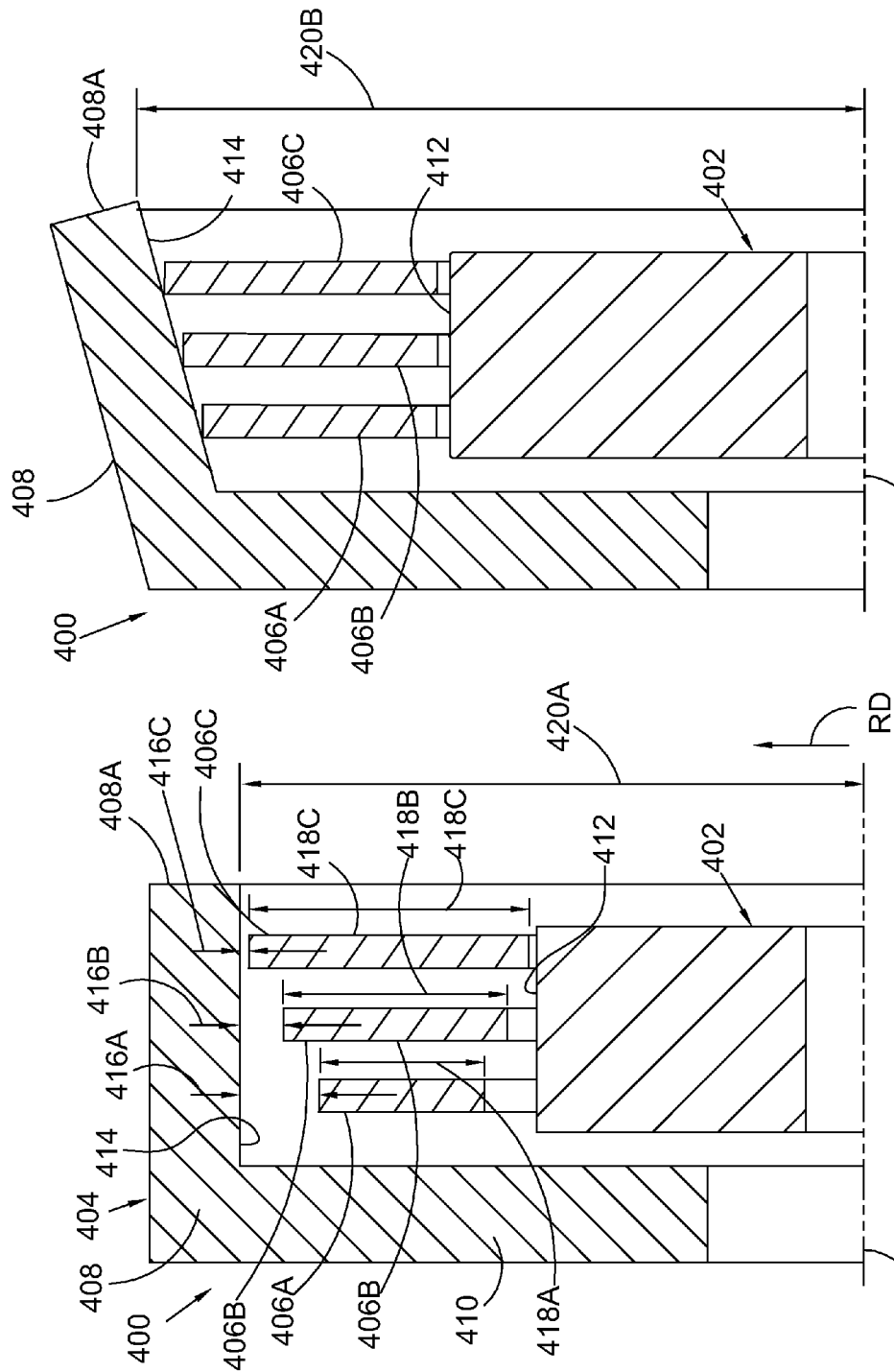

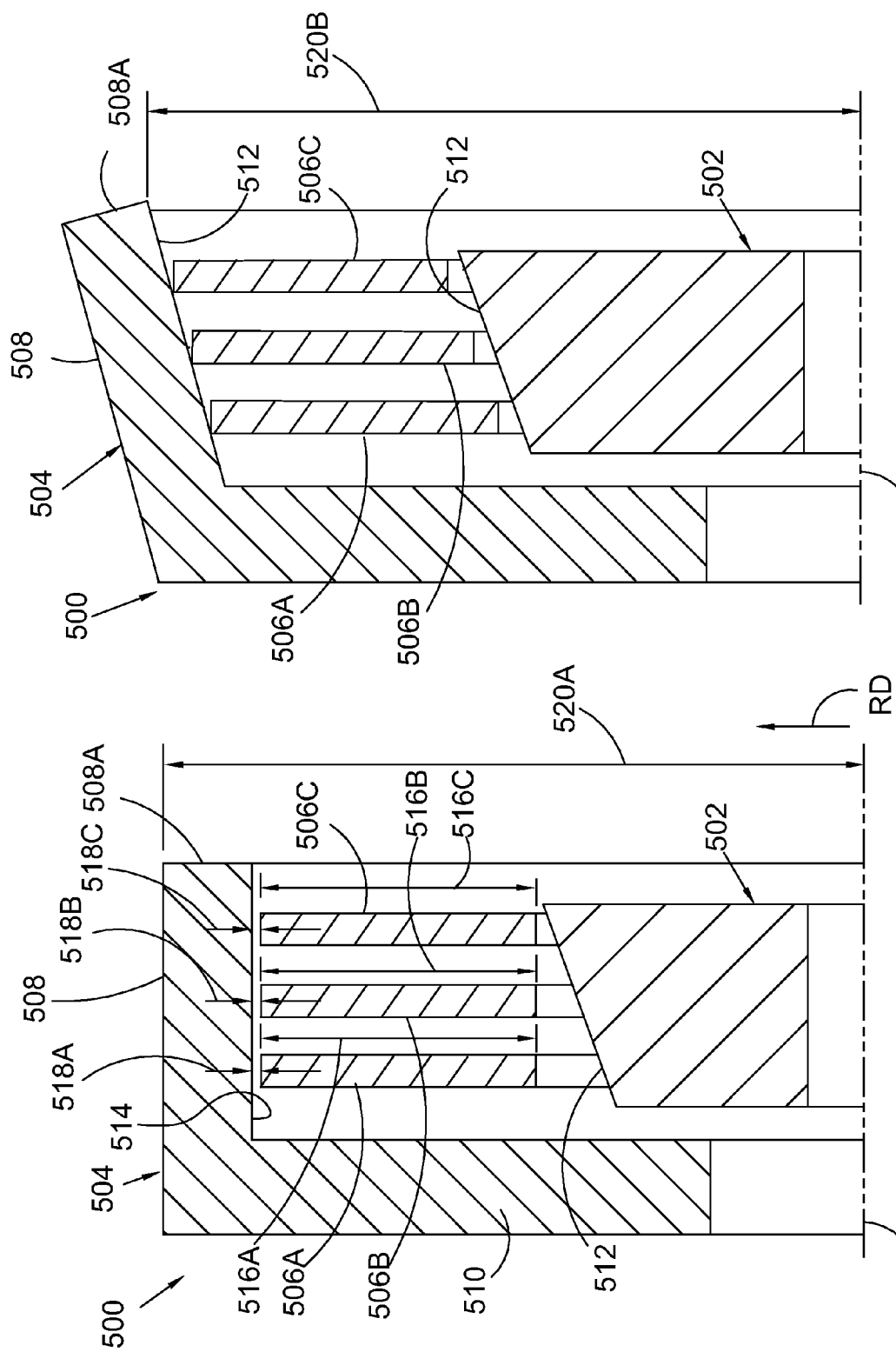

US 9,429,199 B2

ALL-WHEEL DRIVE DISCONNECT CLUTCH

CROSS-REFERENCE TO RELATED APPLICATIONS

This application claims the benefit under 35 U.S.C. §119 (e) of U.S. Provisional Application No. 61/844,109, filed Jul. 9, 2013, which application is incorporated herein by reference in its entirety.

TECHNICAL FIELD

The present disclosure relates to a wedge disconnect clutch for an all-wheel drive. In particular, a wedge disconnect clutch that compensates for radially outward deformation of an outer race in a closed position of the clutch by tapering an outer race or inner hub or by staggering respective radial dimensions of wedge plates

BACKGROUND

FIG. 8 is a schematic partial cross-sectional view of prior art wedge clutch 600 showing radial distortion. In FIG. 8, the solid lines show wedge clutch 600 in an open position, for example, wedge plates 606A, 606B, and 606C are rotatable with respect to outer race 604. Wedge plates 606A, 606B, and 606C each have a same radial extent 608. In FIG. 8, the dashed lines show clutch 600 in a closed position, that is, one or more of wedge plates 606A, 606B, and 606C are non-rotatably connected to race 604 and inner hub 602. In the closed position, one or more of wedge plates 606A, 606B, and 606C exert force radially outward on race 604. Due to the cantilever configuration of race 604, race 604 is deformed and axial end 604A is displaced radially outward as shown by the dashed lines by the radial force from plates 606. The displacement of end 604A causes uneven loading on wedge plates 606A, 606B, and 606C. For example, wedge plate 606A has the most solid contact with the outer race and inner hub and typically carries more load than wedge plates 606B and 606C. In like manner, wedge plate 606B typically carries more load than wedge plate 606C. The uneven loading of wedge plates 606A, 606B, and 606C may cause durability problems. For example, wedge plate 606A can be loaded beyond its design capacity leading to higher wear and fatigue. In addition, the torque transmittable by clutch 600 may be reduced due to the uneven loading.

SUMMARY

According to aspects illustrated herein, there is provided a wedge clutch, including: an inner hub; an outer race including an axially extending portion; and a plurality of wedge plates radially located between the inner hub and the axially extending portion. In a closed position for the clutch, the plurality of wedges is non-rotatably connected to the inner hub and the axially extending portion. In an open position for the clutch: the plurality of wedge plates is rotatable with respect to the outer race; each wedge plate is separated, in a radial direction, from the axially extending portion by a respective first radial distance; and the respective first radial distance for said each wedge plate is different from the respective first radial distance for each remaining wedge plate in the plurality of wedge plates.

According to aspects illustrated herein, there is provided a wedge clutch, including: an inner hub; an outer race including an axially extending portion; and a plurality of wedge plates radially located between the inner hub and the axially extending portion. In a closed position for the clutch, the plurality of wedges is non-rotatably connected to the inner hub and the axially extending portion. Said each wedge plate includes a respective maximum radial extent. The respective maximum extent is a respective distance, in radial direction orthogonal to an axis of rotation for the wedge clutch, between a respective first portion of said each wedge plate closest to the axis of rotation and a respective second portion of said each wedge plate furthest from the axis of rotation. The respective maximum radial extent for said each wedge plate is different from the respective maximum radial extent for said each remaining wedge plate in the plurality of wedge plates.

According to aspects illustrated herein, there is provided a wedge clutch, including: an inner hub including an outer circumferential surface tapering radially inward in an axial direction; outer race including an axially extending portion; and a plurality of wedge plates radially located between the outer circumferential surface and the axially extending portion. In a closed position for the clutch, the plurality of wedges is non-rotatably connected to the outer circumferential surface and the axially extending portion. In an open position for the clutch the plurality of wedge plates is rotatable with respect to the outer race. The outer circumferential surface tapers radially inward in a first axial direction; or the inner circumferential surface tapers radially inward in a second axial direction, opposite the first axial direction.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 2A is a schematic partial cross-sectional view of a wedge clutch, with compensation for radial distortion, in an open position;

FIG. 2B is a schematic partial cross-sectional view of the wedge clutch in FIG. 2A in a closed position;

FIG. 3A is a schematic partial cross-sectional view of a wedge clutch, with compensation for radial distortion, in an open position;

FIG. 3B is a schematic partial cross-sectional view of the wedge clutch in FIG. 3A in a closed position;

FIG. 4A is a partial cross-sectional view of a wedge clutch, with compensation for radial distortion, in an open position;

FIG. 4B is a schematic partial cross-sectional view of the wedge clutch in FIG. 4A in a closed position;

FIG. 5A is a schematic partial cross-sectional view of a wedge clutch, with compensation for radial distortion, in an open position;

FIG. 5B is a schematic partial cross-sectional view of the wedge clutch in FIG. 5A in a closed position;

FIG. 6A is a schematic partial cross-sectional view of a wedge clutch, with compensation for radial distortion, in an open position;

FIG. 6B is a schematic partial cross-sectional view of the wedge clutch in FIG. 6A in a closed position;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
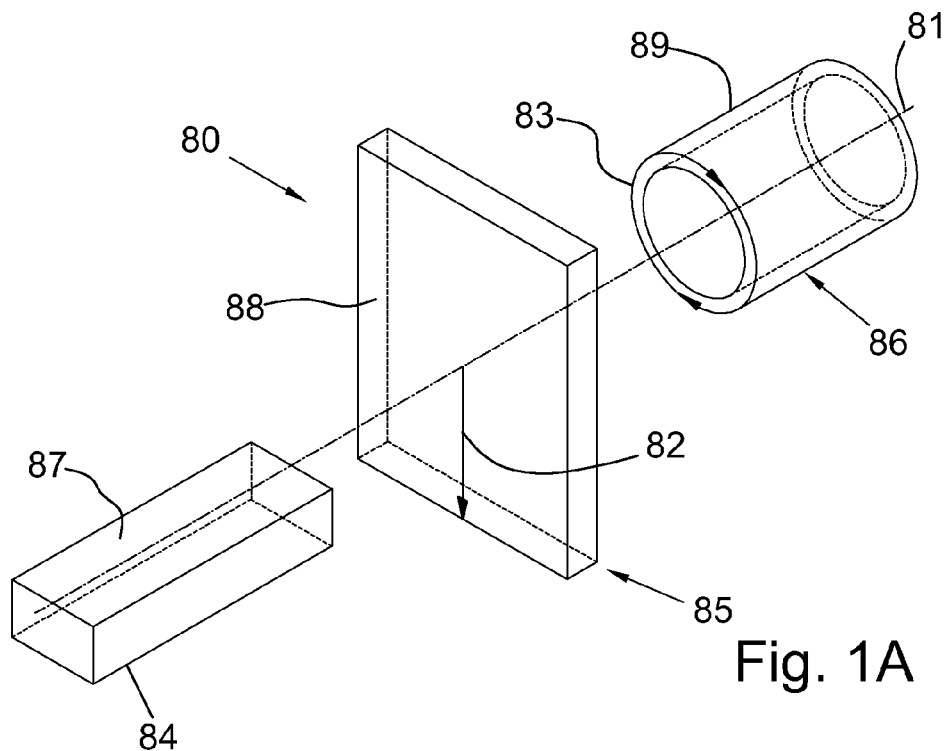
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
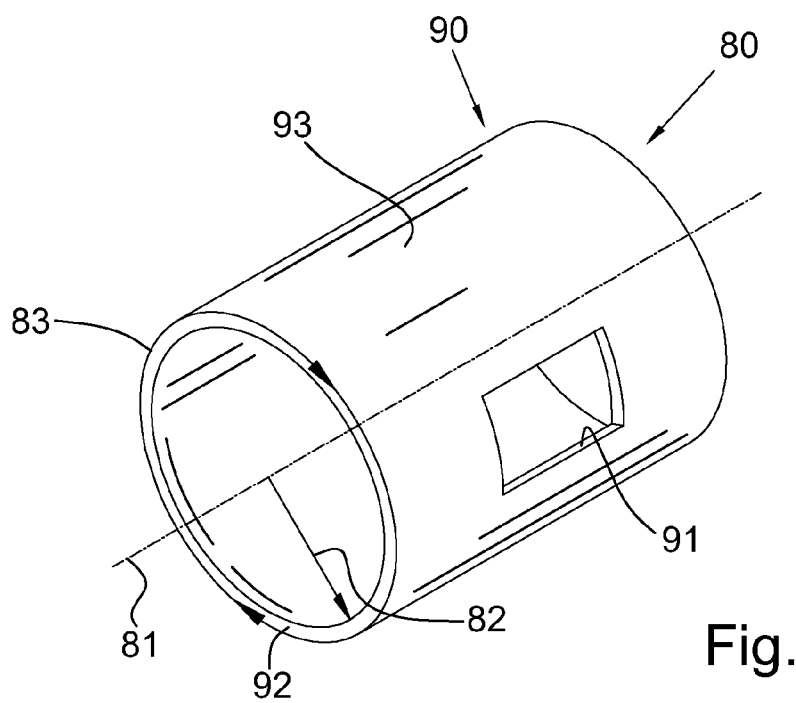
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

It should be understood that FIGS. 2A through 6B are schematic in nature and are not to scale. Further, features in FIGS. 2A through 6B such as proportions, sizes, lengths, spacing, widths, radial gaps between wedge plates and outer races, and contact surfaces between wedge plates and outer races, are not to scale and may be exaggerated or otherwise altered for the sake of clarity.

FIG. 2A is a schematic partial cross-sectional view of wedge clutch 100, with compensation for radial distortion, in an open position.

FIG. 2B is a schematic partial cross-sectional view of wedge clutch 100 in FIG. 2A in a closed position. The following should be viewed in light of FIGS. 2A and 2B. Wedge clutch 100 includes inner hub 102, outer race 104, and wedge plates 106. Race 104 includes axially extending portion 108 and radially extending portion 110. Wedge plates 106 are radially located between the inner hub and axially extending portion 108, in particular, between ramped outer circumferential surface 112 of the inner hub and inner circumferential surface 114 of portion 108.

In the open position of FIG. 2A wedge plates 106 are non-rotatable with respect to the inner hub and rotatable with respect to the outer race. Each wedge plate 106 is separated, in radial direction RD, from axially extending portion 108 by a respective radial distance 116. For example, wedge plates 106A, 106B, and 106C are separated from portion 108 by distances 116A, 116B, and 116C, respectively. Radial distance 116 for each wedge plate 106 is different from respective radial distance 116 for each remaining wedge plate 106. That is, distances 116A, 116B, and 116C are each different from each other. The differences in distances 116A, 116B, and 116C are due to surface 114 tapering radially inward in axial direction AD. In an example embodiment, surface 112 is parallel to axis of rotation AR for clutch 100 in the open position for clutch 100.

In an example embodiment, distance 116A is greater than distances 116B and 116C and distance 116B is greater than distance 116C. In an example embodiment, the maximum radial extents 118 of plates 106 are substantially equal. By "substantially equal" we mean the extents are equal to the degree reasonable within the constraints of known fabricating techniques, or that the extents are sufficiently equal from a functional viewpoint. The maximum radial extent is measured, in direction RD, from a point closest to axis AR to a point furthest from AR on a plate 106.

As further described below, to transmit from the open clutch position of FIG. 2A to the closed clutch position of FIG. 2B, rotation of plates 106 with respect to the inner hub is enabled, causing plates 106 to slide across the inner hub, to expand radially outward, and to non-rotatably connect with portion 108 and the inner hub. Plates 106 substantially rotate, slide, and radially expand in unison so that radial ends 120A, 120B, and 120C of plates 106A, 106B, and 106C, respectively, remain substantially parallel to axis AR as plates 106 expand radially outward. By "substantially parallel" we mean parallel to the degree reasonable within the constraints of known fabricating techniques, or sufficiently parallel from a functional viewpoint.

As noted above, closing wedge clutch 100 causes portion 108 to flex or distort radially outward, for example, radial extent 122A of end 108A in FIG. 2A increases to radial extent 122B of end 108A in FIG. 2B. Advantageously, the axial taper of surface 114 compensates clutch 100 for the radially outward distortion of portion 108 in the closed position for the clutch. Thus, each of wedge plates 106A, 106B, and 106C is equally engaged with the inner hub and portion 108 and transmits substantially the same amount of torque in the closed position for clutch 100.

FIG. 3A is a schematic partial cross-sectional view of wedge clutch 200, with compensation for radial distortion, in an open position.

FIG. 3B is a schematic partial cross-sectional view of wedge clutch 200 in FIG. 3A in a closed position. The following should be viewed in light of FIGS. 3A and 3B. Wedge clutch 200 includes inner hub 202, outer race 204, and wedge plates 206. Race 204 includes axially extending portion 208 and radially extending portion 210. Wedge plates 206 are radially located between the inner hub and axially extending portion 208, in particular between outer circumferential surface 212 of the inner hub and inner circumferential surface 214 of portion 208.

In the open position of FIG. 3A wedge plates 206 are non-rotatable with respect to the inner hub and rotatable with respect to the outer race. Each wedge plate 206 is separated, in radial direction RD, from axially extending portion 208 by a respective radial distance 216. For example, wedge plates 206A, 206B, and 206C are separated from portion 208 by distances 216A, 216B, and 216C, respectively. Radial distance 216 for each wedge plate 206 is different from respective radial distance 216 for each remaining wedge plate 206. That is, distances 216A, 216B, and 216C are each different from each other. In an example embodiment, distance 216A is greater than distances 216B and 216C and distance 216B is greater than distance 216C Each wedge plate 206 includes a maximum radial extent 218. The maximum radial extent is measured, in direction RD, from a point or portion on a wedge plate 206 closest to axis AR to a point or portion on the wedge plate 206 furthest from AR. Radial extent 218 for each wedge plate 206 is different from respective radial extent 218 for each remaining wedge plate 206. That is, extents 218A, 218B, and 218C are each different from each other. In an example embodiment, extent 218C is greater than extents 218B and 218A and extent 218B is greater than extent 218A. In an example embodiment, surfaces 212 and 214 are substantially parallel to axis of rotation AR for clutch 200 in the open position for clutch 200.

Stated otherwise wedge plates 206A, 206B, and 206C include radial portion 220A, 220B, and 220C, respectively, furthest, in radial direction RD from axis of rotation AR for wedge clutch 200. Radial portions 220A, 220B, and 220C are at radial distances 222A, 222B, and 222C from axis AR. Each distance 222 is different from the remaining distances 222. In an example embodiment, distance 222C is greater than distances 222B and 222A and distance 222B is greater than distance 222A.

As further described below, to transmit from the open clutch position of FIG. 3A to the closed clutch position of FIG. 3B, rotation of plates 206 with respect to the inner hub is enabled, causing plates 206 to slide across the inner hub, to expand radially outward, and to non-rotatably connect plates 206 with the inner hub and portion 208. Plates 206 substantially rotate, slide, and radially expand in unison so that radial end 220C first contacts surface 212, followed by end 220B, followed by end 220A.

As noted above, closing wedge clutch 200 causes portion 208 to flex or distort radially outward, for example, radial extent 224A of end 208A in FIG. 3A increases to radial extent 224B of end 208A in FIG. 3B. Advantageously, the differences among distances 216A, 216B, and 216C, extents 218A, 218B, and 218C, and distances 220A, 220B, and 220C, compensate clutch 200 for the radially outward distortion of portion 208 in the closed position for the clutch. Thus, each of wedge plates 206A, 206B, and 206C is equally engaged with the inner hub and portion 208 and transmits substantially the same amount of torque in the closed position for clutch 200.

FIG. 4A is a schematic partial cross-sectional view of wedge clutch 300, with compensation for radial distortion, in an open position.

FIG. 4B is a schematic partial cross-sectional view of wedge clutch 300 in FIG. 4A in a closed position. The following should be viewed in light of FIGS. 4A and 4B. Wedge clutch 300 includes inner hub 302, outer race 304, and wedge plates 306. Race 304 includes axially extending portion 308 and radially extending portion 310. Wedge plates 306 are radially located between the inner hub and axially extending portion 308, in particular between outer circumferential surface 312 of the inner hub and inner circumferential surface 314 of portion 308.

In the open position of FIG. 4A wedge plates 306 are non-rotatable with respect to the inner hub and rotatable with respect to the outer race. Wedge plates 306A, 306B, and 306C include maximum radial extents 316A, 316B, and 316C. The maximum radial extent is measured, in direction RD, from a point closest to axis AR to a point furthest from AR on a plate 306. Each extent 316 is different from the remaining extents 316. In an example embodiment, extent 316C is greater than extents 316B and 316A and extent 316B is greater than extent 316A. In an example embodiment, surfaces 312 and 314 are substantially parallel to axis of rotation AR for clutch 300 in the open position for clutch 200.

Figure 4C:
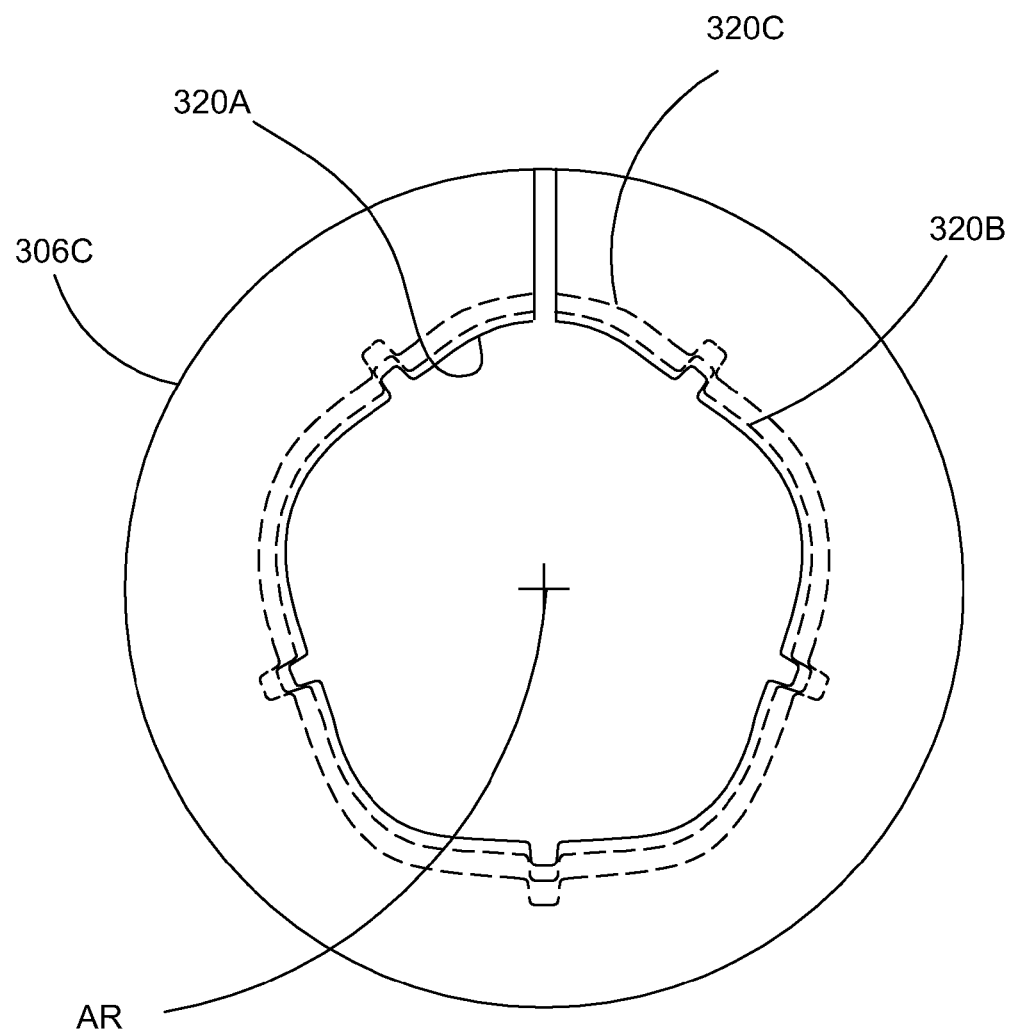
FIG. 4C is a front view of the wedge plates in FIG. 4A.

FIG. 4C is a front view of the wedge plates in FIG. 4A. The following should be viewed in light of FIGS. 4A through 4C. FIG. 4C illustrates how the respective inner circumferences 320 for plates 306 are at different radial distances from axis AR.

As further described below, to transmit from the open clutch position of FIG. 4A to the closed clutch position of FIG. 4B, plates 306 slide across the inner hub, expand radially outward, and non-rotatably connect with the inner hub and 308. Plate 306C begins to slide, expand, and non-rotatably connect before plates 306B and 306A. Plate 306B begins to slide, expand, and non-rotatably connect after plate 306C and before plate 306A. Plate 306A begins to slide, expand, and non-rotatably connect after plates 306C and 306B. Thus, Plate 306C extends further radially outward than plates 306B and 306A and plate 306B extends further radially outward than plate 306A to compensate for the radially outward distortion of portion 308.

As noted above, closing wedge clutch 300 causes portion 308 to flex or distort radially outward, for example, radial extent 318A of end 308A in FIG. 4A increases to radial extent 318B of end 308A in FIG. 4B. Advantageously, the differences among radial extents 316A, 316B, and 316C compensate clutch 300 for the radially outward distortion of portion 308 in the closed position for the clutch. That is, each of wedge plates 306A, 306B, and 306C is equally engaged with the inner hub and portion 308 and transmits substantially the same amount of torque in the closed position for clutch 300.

FIG. 5A is a schematic partial cross-sectional view of wedge clutch 400, with compensation for radial distortion, in an open position.

FIG. 5B is a schematic partial cross-sectional view of wedge clutch 400 in FIG. 5A in a closed position. The following should be viewed in light of FIGS. 5A and 5B. Wedge clutch 400 includes inner hub 402, outer race 404, and wedge plates 406. Race 404 includes axially extending portion 408 and radially extending portion 410. Wedge plates 406 are radially located between the inner hub and axially extending portion 408, in particular between outer circumferential surface 412 of the inner hub and inner circumferential surface 414 of portion 408.

In the open position of FIG. 5A wedge plates 406 are non-rotatable with respect to the inner hub and rotatable with respect to the outer race. Clutch 400 includes features included in clutch 200 and clutch 300. For example, distances 416A, 416B, and 416C are analogous to distances 216A, 216B, and 216C for clutch 200, and extents 418A, 418B, and 418C are analogous to extents 316A, 316B, and 316C. In an example embodiment, surfaces 412 and 414 are substantially parallel to axis of rotation AR for clutch 400.

As further described below, to transmit from the open clutch position of FIG. 5A to the closed clutch position of FIG. 5B, rotation of plates 406 with respect to the inner hub is enabled, causing plates 406 to slide across the inner hub, to expand radially outward, and to non-rotatably connect with the inner hub and portion 408. The respective descriptions for clutches 200 and 300 regarding the radial expansion of wedge plates are applicable to clutch 400.

As noted above, closing wedge clutch 400 causes portion 408 to flex or distort radially outward, for example, radial extent 420A of end 408A in FIG. 5A increases to radial extent 420B of end 408A in FIG. 5B. Advantageously, the differences among distances 416A, 416B, and 416C, and extents 418A, 418B, and 418C, compensate clutch 400 for the radially outward distortion of portion 408 in the closed position for the clutch. That is, each of wedge plates 406A, 406B, and 406C is equally engaged with the inner hub and portion 408 and transmits substantially the same amount of torque in the closed position for clutch 400.

FIG. 6A is a schematic partial cross-sectional view of wedge clutch 500, with compensation for radial distortion, in an open position.

FIG. 6B is a schematic partial cross-sectional view of wedge clutch 500 in FIG. 6A in a closed position. The following should be viewed in light of FIGS. 6A and 6B. Wedge clutch 500 includes inner hub 502, outer race 504, and wedge plates 506. Race 504 includes axially extending portion 508 and radially extending portion 510. Wedge plates 506 are radially located between the inner hub and axially extending portion 508, in particular between outer circumferential surface 512 of the inner hub and inner circumferential surface 514 of portion 508. Surface 512 is axially tapering in axial direction AD.

In the open position of FIG. 6A wedge plates 506 are non-rotatable with respect to the inner hub and rotatable with respect to the outer race. Wedge plates 506A, 506B, and 506C include maximum radial extent 516A, 516B, and 516C, respectively. The maximum radial extent is measured, in direction RD, from a point or portion on a wedge plate 506 closest to axis AR to a point or portion on the wedge plate 506 furthest from AR. Radial extent 516 for each wedge plate 506 is substantially equal to the respective radial extent 516 for each remaining wedge plate 506. That is, extents 516A, 516B, and 516C are each substantially equal. In an example embodiment, surface 514 is substantially parallel to axis of rotation AR for clutch 500 in the open position for clutch 500.

Wedge plates 506A, 506B, and 506C are separated, in radial direction RD, from axially extending portion 508 by a radial distances 518A, 518B, and 518C, respectively. Radial distances 518A, 518B, and 518C are substantially equal to each other.

As further described below, to transmit from the open clutch position of FIG. 6A to the closed clutch position of FIG. 6B, rotation of plates 506 with respect to the inner hub is enabled, causing plates 506 to slide across the inner hub, to expand radially outward, and to non-rotatably connect with the inner hub and portion 508. Plate 506C begins to rotate, slide, and non-rotatably connect before plates 506B and 506A due to the taper of surface 512. Plate 506B begins to rotate, slide, and non-rotatably connect after plate 506A and before plate 506C. Plate 506C begins to rotate, slide, and non-rotatably connect after plates 506A and 506B. Thus, Plate 506C extends further radially outward than plates 506B and 506A and plate 506B extends further radially outward than plate 506A to compensate for the radially outward distortion of portion 508.

As noted above, closing wedge clutch 500 causes portion 508 to flex or distort radially outward, for example, radial extent 520A of end 508A in FIG. 6A increases to radial extent 520B of end 508A in FIG. 6B. Advantageously, the axial taper of surface 512 compensates clutch 500 for the radially outward distortion of portion 508 in the closed position for the clutch. That is, each of wedge plates 506A, 506B, and 506C is equally engaged with the inner hub and portion 508 and transmits substantially the same amount of torque in the closed position for clutch 500.

Figures 7A, 7B:
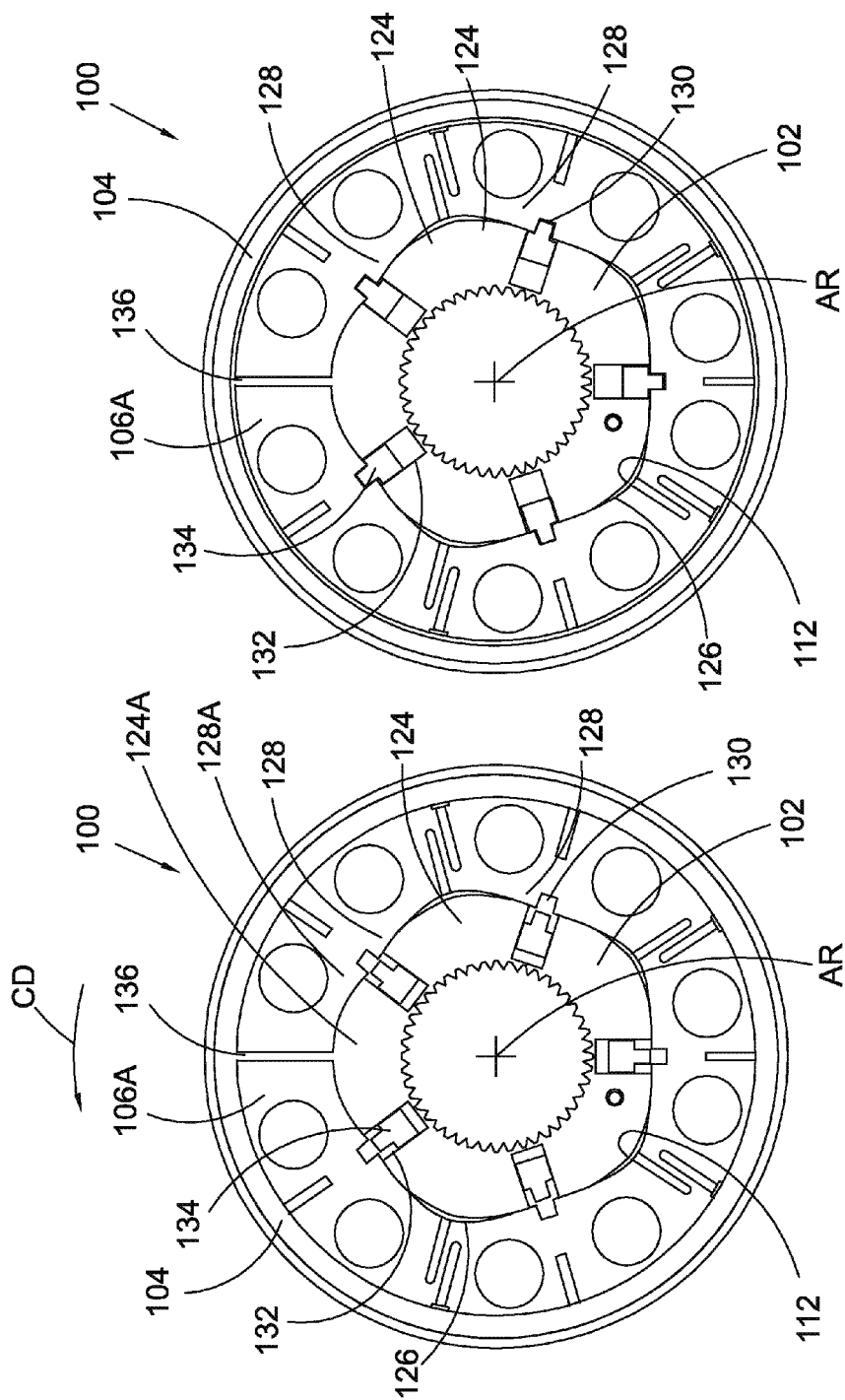
FIG. 7A is a front view of a wedge clutch, with compensation for radial distortion, showing a single wedge plate with wedge keys extended for a clutch in an open position.
FIG. 7B is a front view of the wedge clutch of FIG. 7A showing the wedge keys withdrawn for a clutch in an closed position; and, FIG. 8 is a schematic partial cross-sectional view of a prior art wedge clutch showing radial distortion.
Figure 8:
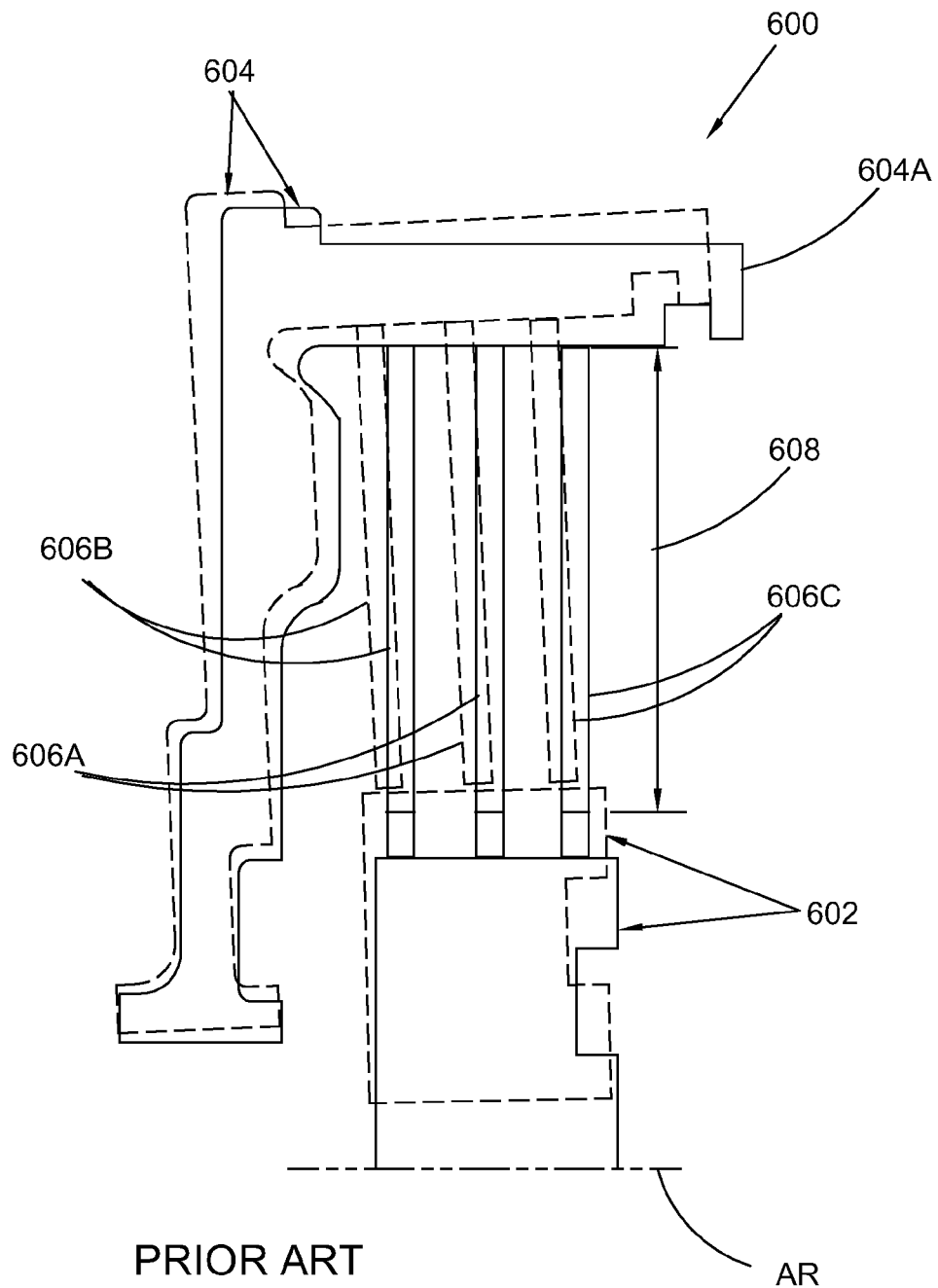

FIG. 7A is a front view of a wedge clutch, with compensation for radial distortion, showing a single wedge plate with wedge keys extended for the clutch in an open position.

FIG. 7B is a front view of the wedge clutch of FIG. 7A showing the wedge keys withdrawn for the clutch in a closed position. The following should be viewed in light of FIGS. 2A through 7B. The description that follows is directed to clutch 100 and wedge plate 106A; however, it should be understood that the description is applicable to wedge plates 106B and 106C as well. Further, FIGS. 7A and 7B are generally applicable to clutches 100 through 500. The example description of FIGS. 7A and 7B is with respect to clutch 100 of FIGS. 2A and 2B; however, it should be understood that the description of FIGS. 7A and 7B is applicable to clutches 200 through 500 as well.

Inner hub 102 includes outer circumferential surface 112 including radially outwardly extending ramps 124. Wedge plate 106A includes inner circumference 126 with radially inwardly extending ramps 128. To transit from the open position of clutch 100 to the closed position for clutch 100, ramps 128 are arranged to rotate with respect to ramps 124 to urge the plurality of wedge plates radially outward. Plate 106A includes slots 130 in radially inner circumference 126. The inner hub includes slots 132 in radially outer surface or circumference 112. Wedge clutch 100 includes respective keys 134 disposed within each slot 132 and radially displaceable within slot 132 by any means known in the art.

In the open position for the clutch, as shown in FIG. 7A, each key 134 is at least partially disposed in a respective slot 130 to non-rotatably connect wedge plate 106A with the inner hub. Keys 134 non-rotatably connect plate 106A with the inner hub. Plate 106A is rotatable with respect to the outer race. Relative rotation of plate 106A and the inner hub causes plate 106A to non-rotatably connect the inner hub and portion 108. However, keys 134 prevent this relative rotation.

To transit from the open position of clutch 100 to the closed position for clutch 100 shown in FIG. 7B, keys 134 are displaced radially inward within slots 132 and out of slots 130 to enable rotation of wedge plate 106A with respect to the inner hub, for example due to frictional engagement of plate 106A with the outer race. For relative rotation of plate 106A with respect to the inner hub in circumferential directions CD, ramp 128A begins to slide along ramp 124A in direction CD. Thus, the radially inwardly increasing portion of ramp 128A slides across the radially outwardly increasing portion of ramp 124A causing wedge plate 106A to expand radially outward to relieve the force between ramps 124A and 128A. As a result, plate 106A is wedged between the inner hub and portion 108, non-rotatably connecting the inner hub and portion 108. In an example embodiment, plate 106A includes gap 136 to facilitate radial displacement of plate 106A. In an example embodiment, plate 106A is biased radially outward so that plate 106A contacts the outer race. Further details regarding a wedge clutch with keys are provided in commonly owned U.S. patent application Ser. No. 13/849,142, which reference is incorporated in its entirety herein.

The following should be viewed in light of FIGS. 2A through 7B. Advantageously, clutches 100 through 500 eliminate the uneven loading of wedge plates described above. For a closed position of clutches 100 through 500, by tapering an inner hub or an outer race or by varying the radial extents of wedge plates, the radial distortion of the outer race is compensated and each wedge plate in the clutch carries substantially the same torque load.

In an example embodiment, some or all of clutches 100, 200, 300, 400, 500, and 600 are used in respective drive disconnect clutch assemblies for all-wheel drive vehicles. The drive disconnect clutch assemblies are used to disconnect wheels of the vehicle from the power train of the vehicle. Using clutch 100 as an example, a wheel is non-rotatably connected to the outer race and the inner hub is connected to a power train. When clutch 100 is in the open position, the wheel is rotatable with respect to the inner hub and is disconnected from the power train. When clutch 100 is in the closed position, the wheel is non-rotatably connected to the inner hub and the inner hub transmits torque to the wheel.

Although three wedge plates are shown in FIGS. 2A through 6B, it should be understood that other numbers of wedge plates are possible in clutches 100, 200, 300, 400, 500, and 600. It also should be understood that clutches 100, 200, 300, 400, 500, and 600 do not need to each have the same number of clutches.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A wedge clutch, comprising:
   an inner hub;
   an outer race including an axially extending portion; and,
   a plurality of wedge plates radially located between the inner hub and the axially extending portion, wherein:
   in a closed position for the clutch, the plurality of wedges are non-rotatably connected to the inner hub and the axially extending portion; and,
   in an open position for the clutch:
   the plurality of wedge plates is rotatable with respect to the outer race;
   each wedge plate is separated, in a radial direction, from the axially extending portion by a respective first radial distance; and,
   the respective first radial distance for said each wedge plate is different from the respective first radial distance for each remaining wedge plate in the plurality of wedge plates.

2. The wedge clutch of claim 1, wherein in the open position:
   said each wedge plate includes a respective radial portion furthest, in the radial direction, from an axis of rotation for the wedge clutch;
   each respective radial portion is at a respective second radial distance from the axis of rotation; and,
   the respective second radial distance for said each wedge plate is different from the respective second radial distance for said each remaining wedge plate in the plurality of wedge plates.

3. The wedge clutch of claim 1, wherein:
   the axially extending portion includes an inner circumferential surface;
   the plurality of wedge plates is radially located between the inner hub and the inner circumferential surface; and,
   in the open position, the inner circumferential surface is substantially parallel to an axis of rotation for the wedge clutch.

4. The wedge clutch of claim 1, wherein:
   the inner hub includes an outer circumferential surface;
   the plurality of wedge plates is radially located between the outer circumferential surface and the axially extending portion; and,
   the outer circumferential surface is substantially parallel to an axis of rotation for the wedge clutch.

5. The wedge clutch of claim 1, wherein:
   the axially extending portion includes an inner circumferential surface;
   the plurality of wedge plates is radially located between the inner circumferential surface and the inner hub; and,
   in the open position, the inner circumferential surface tapers radially inward in an axial direction.

6. The wedge clutch of claim 1, wherein:
   said each wedge plate includes a respective maximum radial extent;
   the respective maximum extent is a respective distance, in the first radial direction, between:
   a respective first portion of said each wedge plate closest to an axis of rotation for the wedge clutch; and,
   a respective second portion of said each wedge plate furthest from the axis of rotation; and,
   the respective maximum radial extent for said each wedge plate is different from the respective maximum radial extent for said each remaining wedge plate in the plurality of wedge plates.

7. The wedge clutch of claim 1, wherein:
   the inner hub includes an outer circumferential surface including a plurality of radially outwardly extending ramps;
   said each wedge plate includes a respective plurality of radially inwardly extending ramps; and,
   to transit from the open position of the clutch to the closed position for the clutch, the plurality of radially inwardly extending ramps are arranged to rotate with respect to the respective pluralities of radially outwardly extending ramps to urge the plurality of wedge plates radially outward.

8. The wedge clutch of claim 1, wherein:
   said each wedge plate includes a respective plurality of first slots in a respective radially inner circumference; and, the inner hub includes a plurality of second slots in a radially outer circumference, the wedge clutch further comprising:
a respective key disposed within each second slot, wherein:
in the open position for the clutch, each respective key is at least partially disposed in a respective first slot for said each wedge plate to non-rotatably connect the plurality of wedge plates with the inner hub; and,
to transit from the open position of the clutch to the closed position for the clutch, the plurality of keys is arranged to displace radially inward out of the respective first slots to enable rotation of the plurality of wedge plates with respect to the inner hub.

9. A wedge clutch, comprising:
an inner hub;
an outer race including an axially extending portion; and,
a plurality of wedge plates radially located between the inner hub and the axially extending portion, wherein:
in a closed position for the clutch, the plurality of wedges is non-rotatably connected to the inner hub and the axially extending portion;
said each wedge plate includes a respective maximum radial extent;
the respective maximum extent is a respective distance, in radial direction orthogonal to an axis of rotation for the wedge clutch, between:
a respective first portion of said each wedge plate closest to the axis of rotation; and,
a respective second portion of said each wedge plate furthest from the axis of rotation; and,
the respective maximum radial extent for said each wedge plate is different from the respective maximum radial extent for said each remaining wedge plate in the plurality of wedge plates.

10. The wedge clutch of claim 9, wherein:
the axially extending portion includes an inner circumferential surface;
the inner hub includes an outer circumferential surface;
the plurality of wedge plates is radially located between the inner and outer circumferential surfaces; and,
in an open position for the clutch, the inner and outer circumferential surfaces are substantially parallel to the axis of rotation.

11. The wedge clutch of claim 9, wherein:
the inner hub includes an outer circumferential surface including a plurality of radially outwardly extending ramps;
said each wedge plate includes a respective plurality of radially inwardly extending ramps; and,
to transit from the open position of the clutch to the closed position for the clutch, the plurality of radially inwardly extending ramps are arranged to rotate with respect to the respective pluralities of radially outwardly extending ramps to urge the plurality of wedge plates radially outward.

12. The wedge clutch of claim 9, wherein:
said each wedge plate includes a respective plurality of first slots in a respective radially inner circumference; and,
the inner hub includes a plurality of second slots in a radially outer circumference, the wedge clutch further comprising:
a respective key disposed within each second slot, wherein:
in the open position for the clutch, each respective key is at least partially disposed in a respective first slot for said each wedge plate to non-rotatably connect the plurality of wedge plates with the inner hub; and,
to transit from the open position of the clutch to the closed position for the clutch, the plurality of keys is arranged to displace radially inward out of the respective first slots to enable rotation of the plurality of wedge plates with respect to the inner hub.

13. A wedge clutch, comprising:
an inner hub including an outer circumferential surface;
an outer race including:
a radially extending portion; and,
an axially extending portion with an inner circumferential surface, the axially extending portion extending from the radially extending portion in a first axial direction; and,
a plurality of wedge plates radially located between the inner and outer circumferential surfaces,
wherein:
in a closed position for the clutch, the plurality of wedges are non-rotatably connected to the outer circumferential surface and the axially extending portion; and,
in an open position for the clutch the plurality of wedge plates is rotatable with respect to the outer race; and,
wherein:
in the open position, the outer circumferential surface tapers radially inward in a second axial direction, opposite the first axial direction; or,
in the open position, the inner circumferential surface tapers radially inward in the first axial direction.

14. The wedge clutch of claim 13, wherein in the open position:
each wedge plate in the plurality of wedge plates includes a respective radial portion furthest, in the radial direction, from an axis of rotation for the wedge clutch; and,
each respective radial portion is at a same substantially equal radial distance from the axis of rotation.

15. The wedge clutch of claim 13, wherein:
each wedge plate in the plurality of wedge plates includes a respective maximum radial extent;
the respective maximum extent is a respective distance, in the first radial direction, between:
a respective first portion of said each wedge plate closest to an axis of rotation for the wedge clutch; and,
a respective second portion of said each wedge plate furthest from the axis of rotation; and,
the respective maximum radial extent for said each wedge plate is substantially equal to the respective maximum radial extent for said each remaining wedge plate in the plurality of wedge plates.

16. The wedge clutch of claim 13, wherein in the open position for the clutch:
the outer circumferential surface tapers radially inward in the second axial direction;
each wedge plate in the plurality of wedge plates is separated, in a radial direction, from the inner circumferential surface by a respective first radial distance; and,
the respective first radial distances are substantially equal to each other.

17. The wedge clutch of claim 13, wherein in the open position for the clutch:
the inner circumferential surface tapers radially inward in the first axial direction;

each wedge plate in the plurality of wedge plates is separated, in a radial direction, from the inner circumferential surface by a respective first radial distance; and, the respective radial distance for said each wedge plate is different from the respective first radial distance for each remaining wedge plate in the plurality of wedge plates.

18. The wedge clutch of claim 13, wherein in the open position:

the outer circumferential surface tapers radially inward in the second axial direction; and, the inner circumferential surface is substantially parallel to an axis of rotation for the wedge clutch.

19. The wedge clutch of claim 13, wherein in the open position:

the inner circumferential surface tapers radially inward in the first axial direction; and, the outer circumferential surface is substantially parallel to an axis of rotation for the wedge clutch.

* * * * *